(12) United States Patent
Matsuo et al.

(10) Patent No.: US 7,032,610 B2
(45) Date of Patent: Apr. 25, 2006

(54) FLOAT VALVE DEVICE

(75) Inventors: Shinichi Matsuo, Kanagawa (JP); Kenji Yonezawa, Kanagawa (JP)

(73) Assignee: Piolax Inc., Yokohama (JP)

( * ) Notice: Subject to any disclaimer, the term of this patent is extended or adjusted under 35 U.S.C. 154(b) by 16 days.

(21) Appl. No.: 10/820,153

(22) Filed: Apr. 8, 2004

(65) Prior Publication Data

US 2004/0261846 A1    Dec. 30, 2004

(30) Foreign Application Priority Data

Apr. 9, 2003    (JP)    .......................... P 2003-105329

(51) Int. Cl.
*F16K 24/04*    (2006.01)

(52) U.S. Cl. ........................................ 137/202; 137/43

(58) Field of Classification Search .................. 137/43, 137/202
See application file for complete search history.

(56) References Cited

U.S. PATENT DOCUMENTS 6,494,227 B1 *    12/2002    Hattori et al. .............. 137/202

FOREIGN PATENT DOCUMENTS

JP    8-225022    9/1996
JP    3257437    12/2001

* cited by examiner

*Primary Examiner*—Kevin Lee
(74) *Attorney, Agent, or Firm*—McGinn IP Law Group, PLLC

(57) ABSTRACT

An allowable angle of a float valve member with respect to a valve case is so set that a deformed direction, as caused by a gate position at a injection molding time, of a inner circumference of a communication hole of the valve case with respect to a roundness and a deformed direction, as caused by a gate position at a injection molding time, of an outer circumference of a crest portion of the float valve member with respect to the roundness may be substantially aligned. Between the valve case and the float valve member, there is an interposed angle regulating unit for preventing the angle of the float valve member with respect to the valve case from varying over the allowable angle.

3 Claims, 10 Drawing Sheets

FLOAT VALVE DEVICE

BACKGROUND OF THE INVENTION

1. Field of the Invention

The present invention relates to a float valve device suited for a fuel cutoff valve for preventing a fuel from flowing out of the fuel tank of an automobile when the liquid level of the fuel tank rises.

2. Description of the Related Art

In Japanese Patent No. 3,257,437, for example, a fuel cutoff valve of the kind used in related art systems is disclosed. The fuel cutoff valve includes: a case body forming a valve chamber connected to a communication passage for establishing communication of the inside of a fuel tank with the outside; and a float valve member accommodated in the valve chamber and having a closed portion at its upper portion for opening/closing the communication passage so that it may move upward and downward by increasing/decreasing a buoyancy with a liquid fuel in the fuel tank to flow into and out of the valve chamber thereby to open/close the communication passage with the closed portion. The fuel cutoff valve is characterized in that the float valve member includes: a cylindrical float body forming a float chamber; a guide portion having a plurality of fins projecting vertically from the outer side wall portion of the float body and arranged and spaced from each other in the circumferential direction of the float body so that the float body is vertically guided by the individual sliding movements of the ridge portions of the fins on the inner side wall face of the valve chamber; communication passages formed individually between the fins for aerating the upper and lower spaces of the valve chamber partitioned by the float body; and a throttle forming step portion projecting from the outer side wall portion of the float body and between the fins for narrowing a portion of the communication passage.

In JP-A-8-225022, on the other hand, there is disclosed a liquid cutoff valve. This liquid cutoff valve includes: a hollow valve body disposed above a liquid reserving tank; a valve member inserted in the hollow inside of the valve body for moving upward and downward with the level of the tank liquid to flow into the valve body; a passage opened in the upper portion of the valve body for establishing the communication between the inside and outside of the tank; and a valve seat disposed at the opening portion of the passage. The valve member includes: a float; and a valve disc so held above the float as to move relative to the float and having a valve portion, so that the valve portion of the valve disc forming the valve member comes into and out of contact with the valve seat in accordance with the height of the level of the liquid to flow into the valve body, thereby to open/close the passage. The liquid cutoff valve is characterized: in that the valve disc is so held above the float as to be inclined with a plurality of pawls, one of which is shorter than the remaining pawls; and in that on the opposite side of the shorter pawl with respect to the center of the valve seat, there is disposed a projecting portion, against which the upper face of the valve disc is brought into abutment at the valve opening time by the upper portion of the valve body. In this liquid cutoff valve, moreover, rotation stop means for stopping the float relative to the valve body is constructed by forming vertically extending recesses in the side wall of the float and by forming projections on the inner circumference of the valve body for being fitted in the recesses.

In the fuel cutoff valve disclosed in Japanese Patent No. 3,257,437, the fins are vertically projected from the outer circumference of the float body and arranged in parallel at a predetermined spacing so that their ridges may individually slide on the inner wall face of the valve chamber thereby to act as vertical movement guide portions. However, the fuel cutoff valve is not provided with the rotation stop means for stopping the rotation of the float body relative to the case body.

On the other hand, the liquid cutoff valve disclosed in JP-A-8-225022 is provided with the rotation stop means for stopping the rotation of the float relative to the valve body by forming vertically extending recesses in the side wall of the float and by forming projections on the inner circumference of the valve body for being fitted in the recesses. However, this rotation stop means is provided for preventing the interference between the projections disposed on the upper portion of the valve body and the pawls disposed at the upper portion of the float.

On the other hand, those float valve devices are generally manufactured by injection-molding a synthetic resin. Moreover, these float valve devices are closed when the crest portion formed on the upper portion of the float valve member is fitted in close contact with the communication hole formed in the upper wall or partition of the valve case. However, there is such a tendency that the outer circumference of the crest portion of the float valve member or the inner circumference of the communication hole of the valve case may be deformed from the designed round shape in a predetermined direction in dependence upon the gate position at the injection molding time.

However, no consideration has heretofore been taken into those deformations depending upon the gate position. This has raised a problem that the insufficient roundness forms a clearance between the sealing faces thereby to cause a leakage of the liquid.

SUMMARY OF THE INVENTION

It is an object of the invention to provide a float valve device, in which the occurrence of leakage of a liquid is minimized by improving the close contact of the sealing faces at a valve closing time.

In order to achieve the above-specified object, according to a first aspect of the invention, there is provided a float valve device including: a valve case; and a float valve member arranged to acts upward and downward in the valve case, wherein the valve case and the float valve member are injection-molded of a resin, wherein the valve case includes a valve chamber, in which the float valve member is arranged, a partition wall portion formed in the upper portion of the valve chamber, and a communication hole formed in the partition wall portion, and where in the float valve member acts upward and downward according to the level of a liquid to flow into the valve chamber and includes a crest portion for closing the communication hole when it abuts against the partition wall portion, wherein the improvement: resides in that an allowable angle of the float valve member with respect to the valve case is so set that the deformed direction, as caused by the gate position at the injection molding time, of the inner circumference of the communication hole of the valve case with respect to the roundness and the deformed direction, as caused by the gate position at the injection molding time, of the outer circumference of the crest portion of the float valve member with respect to the roundness may be substantially aligned; and a includes angle regulating unit interposed between the valve case and the float valve member for preventing the angle of the float valve member with respect to the valve case from varying over the allowable angle when the float valve member acts upward and downward.

According to the first aspect of the invention, the allowable angle of the float valve member with respect to the valve case is so set that the deformed direction, as caused by the gate position at the injection molding time, of the inner circumference of the communication hole of the valve case with respect to the roundness and the deformed direction, as caused by the gate position at the injection molding time, of the outer circumference of the crest portion of the float valve member with respect to the roundness may be substantially aligned, and the angle regulating unit is interposed between the valve case and the float valve member for preventing the angle of the float valve member with respect to the valve case from varying over the allowable angle when the float valve member acts upward and downward. Therefore, the crest portion of the float valve member abuts at such an angle against the inner circumference of the communication hole of the valve case that their changing directions with respect to the roundness may be aligned with each other, so that the close contact of the sealing faces at the closing time can be improved to prevent the leakage of the liquid more reliably.

In the first aspect of the invention, according to a second aspect, there is provided a float valve device, wherein the angle regulating unit includes: a plurality of vertically extending parallel ribs formed on one of the inner circumference of the valve case and the outer circumference of the float valve member; and a brim formed on the other of the inner circumference of the valve case and the outer circumference of the float valve member and adapted to be fitted in the spacing of the ribs, and wherein the spacing between the ribs to fit the brim therein is made wider than the spacings between the remaining ribs so that the brim may be unable to be fitted in the spacings between the remaining ribs.

According to the second aspect, the upward and downward actions of the float valve member are guided by the vertically extending parallel ribs formed on one of the inner circumference of the valve case and the outer circumference of the float valve member, and the float valve member can always be assembled at a predetermined angle in the valve case by the brims which can be fitted only in the wider ones of the spacings between the ribs. When the float valve member moves upward and downward, they move while being positionally regulated between the aforementioned ribs so that the angle of the float valve member with respect to the valve case is unchanged.

In the second aspect of the invention, according to a third aspect, there is provided a float valve device, wherein the ribs are formed on the inner circumference of the valve case whereas the brim is formed on the outer circumference of the float valve member, and wherein the ribs, which are located between the ribs on the inner circumference of the valve case for fitting the brim therein, are formed within such a partial range only on the upper side as not to obstruct the upward and downward actions of the float valve member.

According to the third aspect, the brim formed on the float valve member is arranged in the wider rib spacing on the inner circumference of the valve case so that the angle of the float valve member with respect to the valve case is regulated. In the wider rib spacing portion, the ribs are formed within such a partial range only on the upper side as not to obstruct the upward and downward actions of the float valve member, so that the rigidity of the valve case can be enhanced as highly as possible.

DESCRIPTION OF THE PREFERRED EMBODIMENT

An embodiment of the invention will be described with reference to the accompanying drawings.

Figure 1:
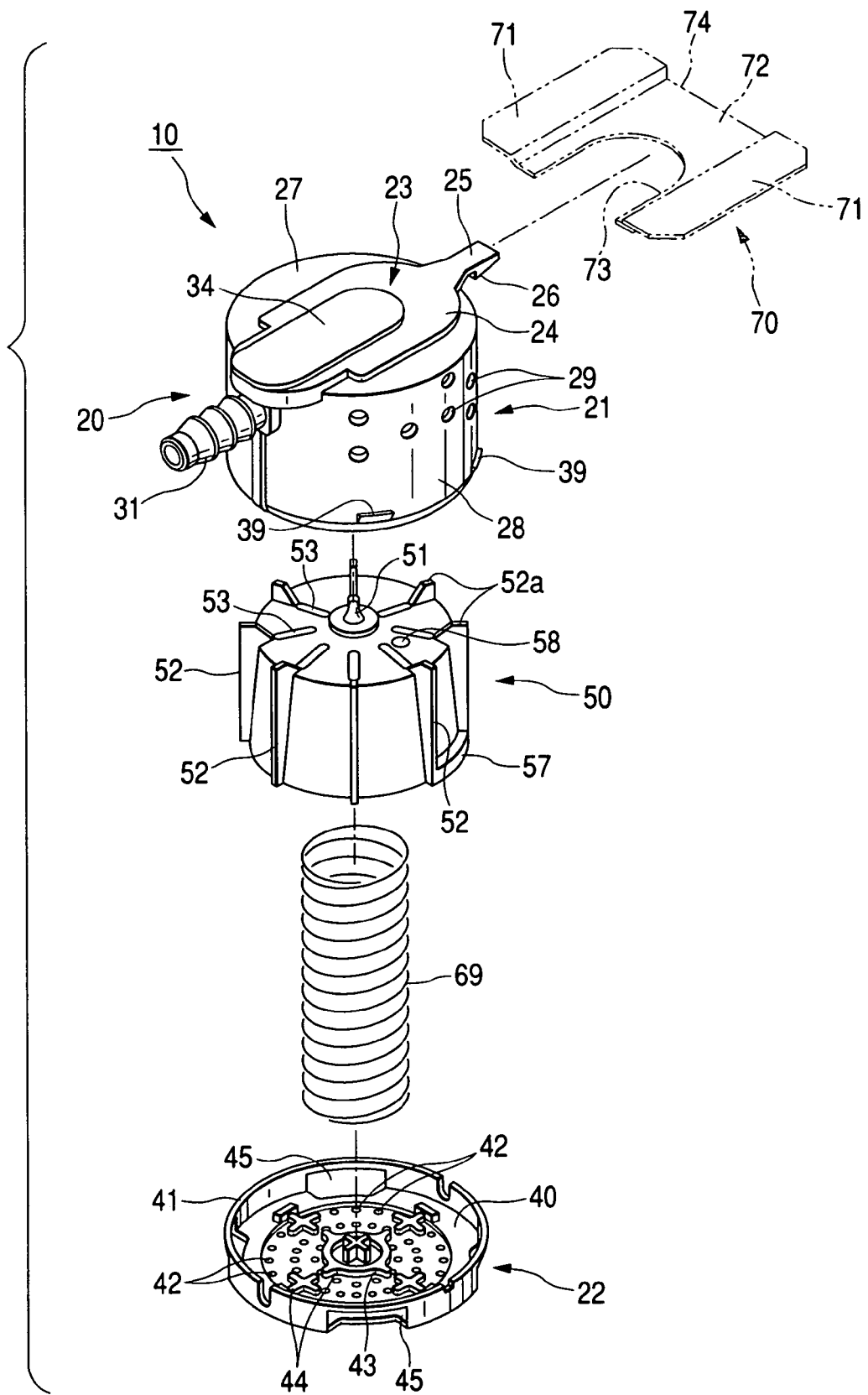
FIG. 1 is an exploded perspective view of a float valve device according to one embodiment of the invention.
Figure 2:
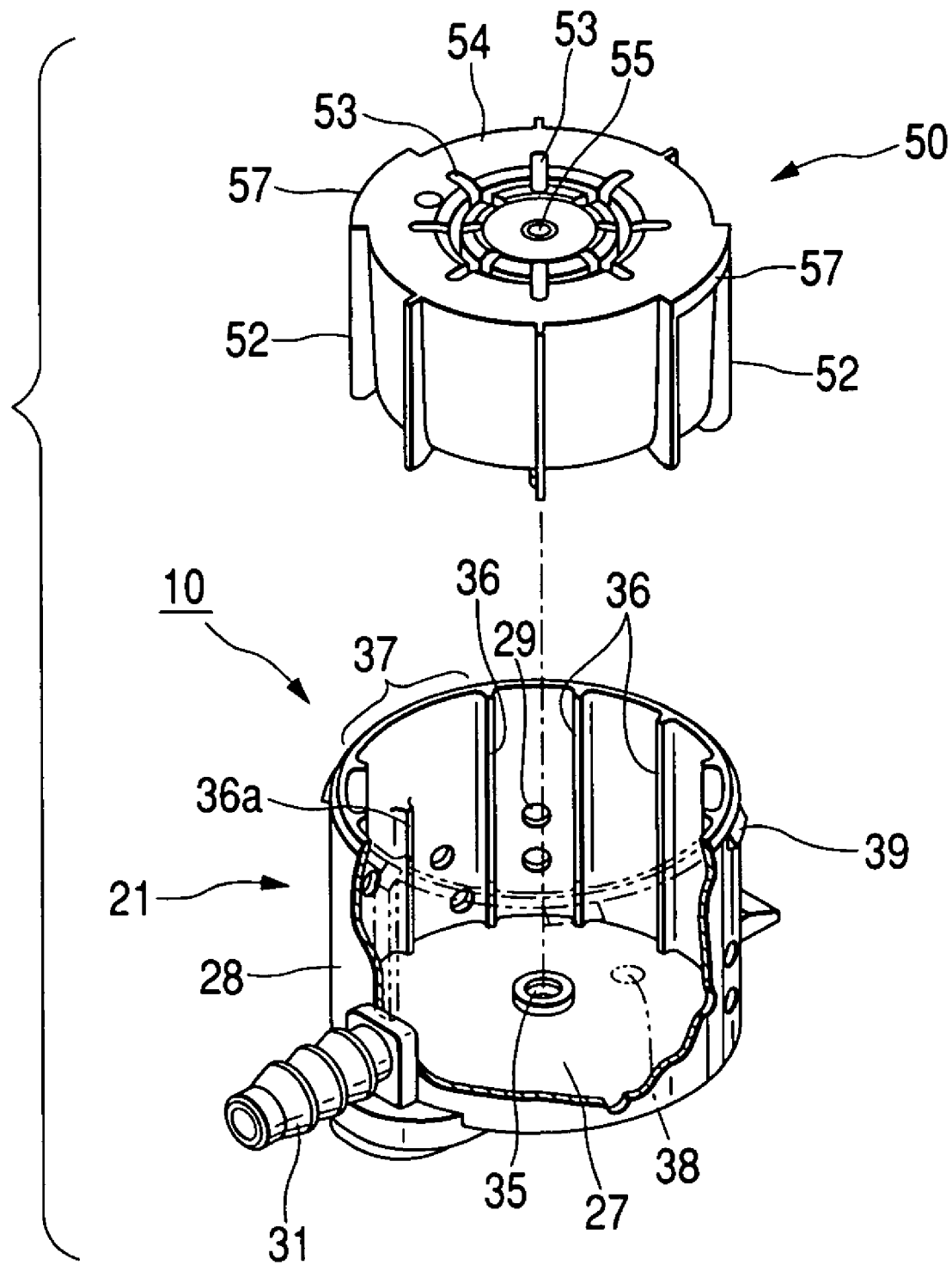
FIG. 2 is a perspective view showing the state of the float valve device, in which a float valve member is to be inserted into a valve case body.
Figure 5:
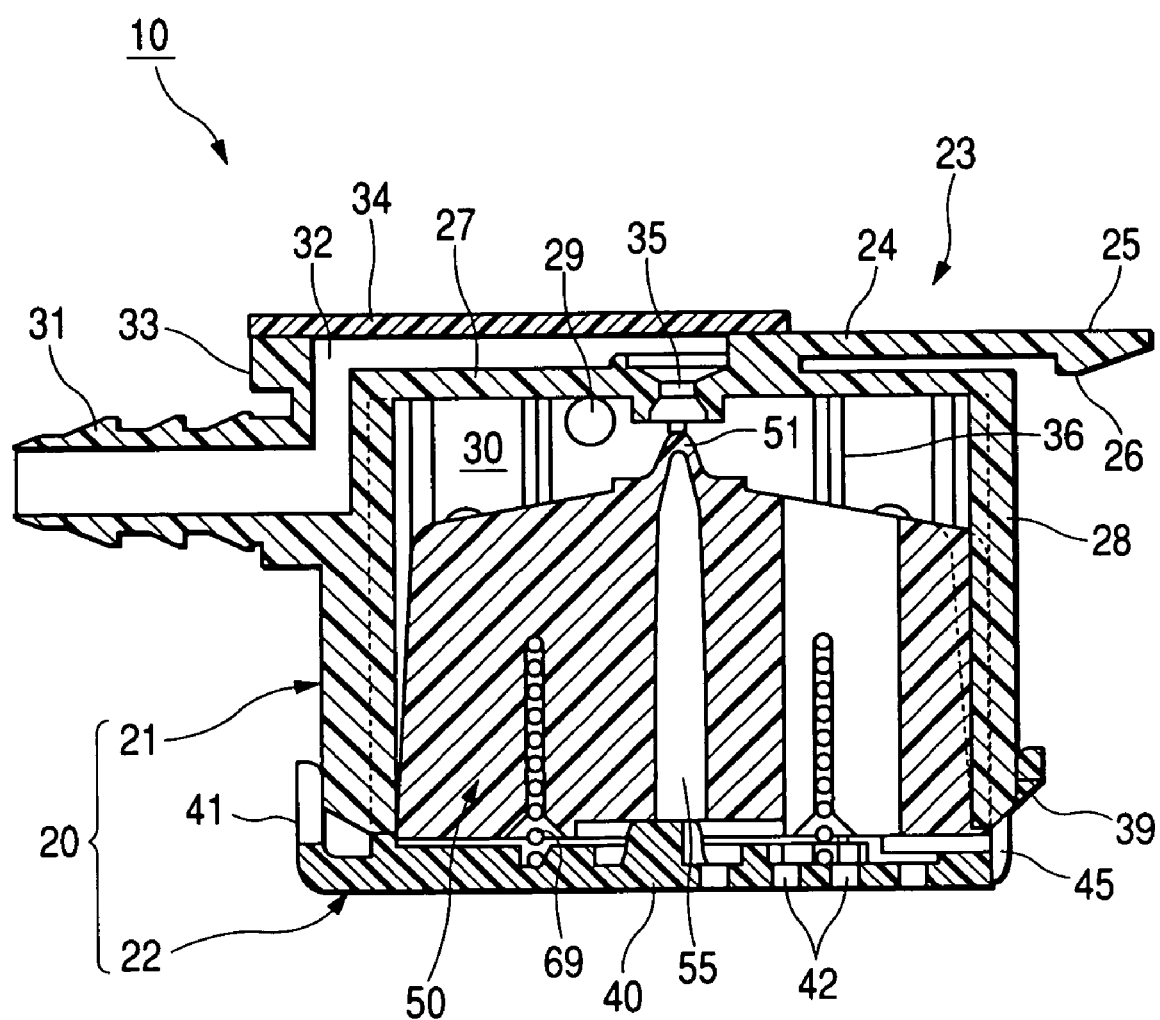
FIG. 5 is a longitudinal section of the float valve device.
Figure 6:
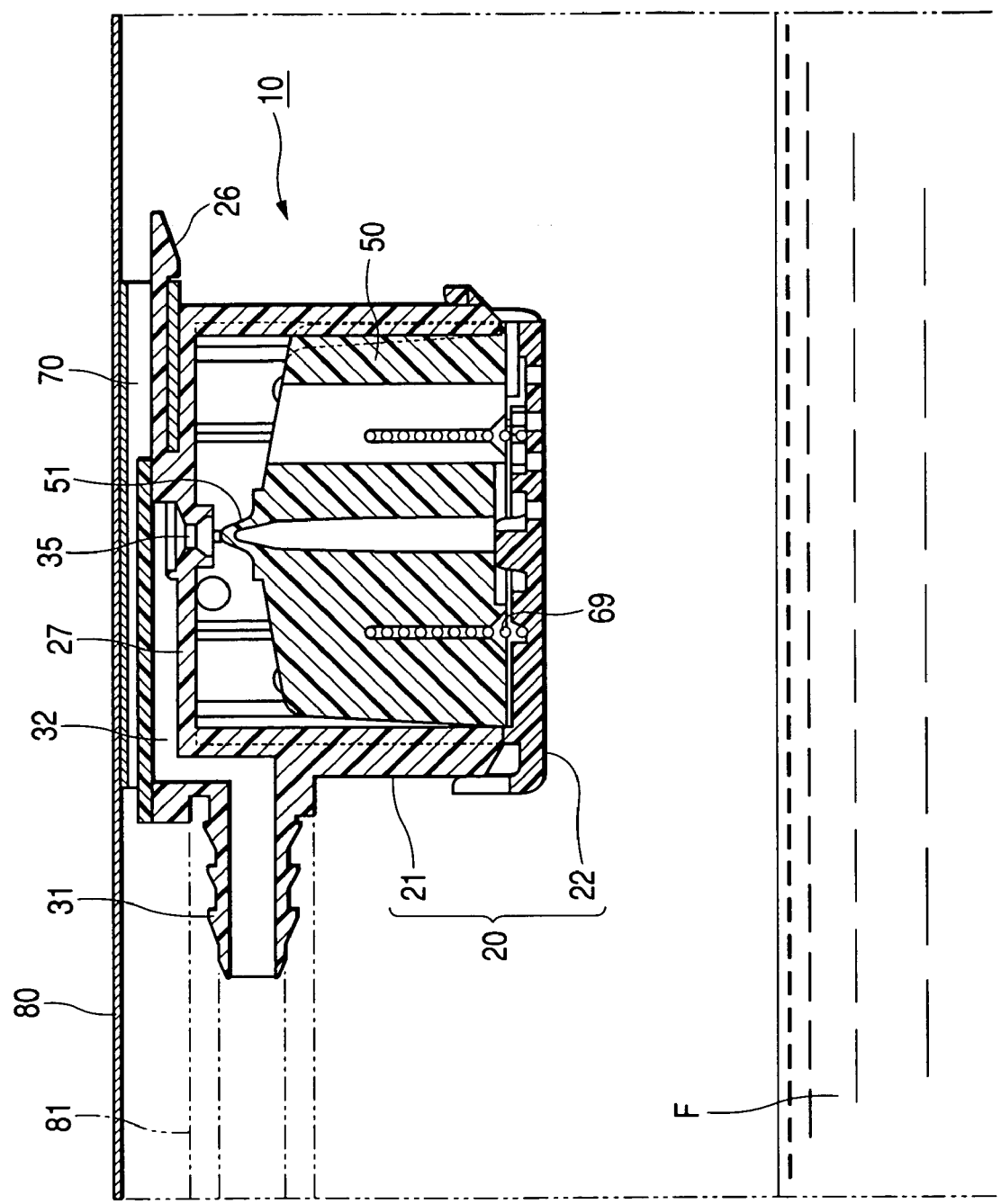
FIG. 6 is an explanatory view showing the state, in which the valve of the float valve device arranged in a fuel tank is opened.
Figure 7:
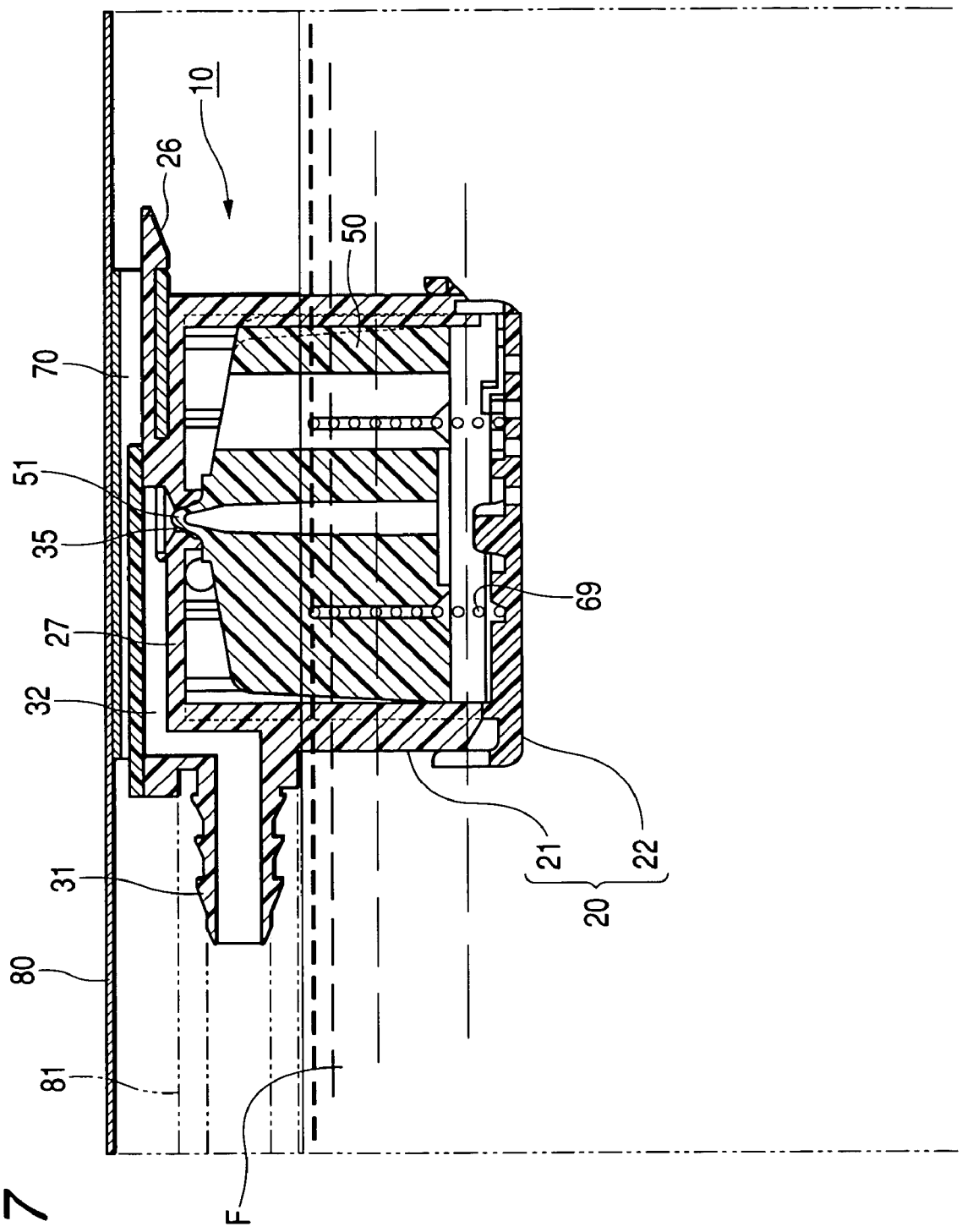
FIG. 7 is an explanatory view showing the state, in which the valve of the float valve device arranged in a fuel tank is closed.
Figure 8:
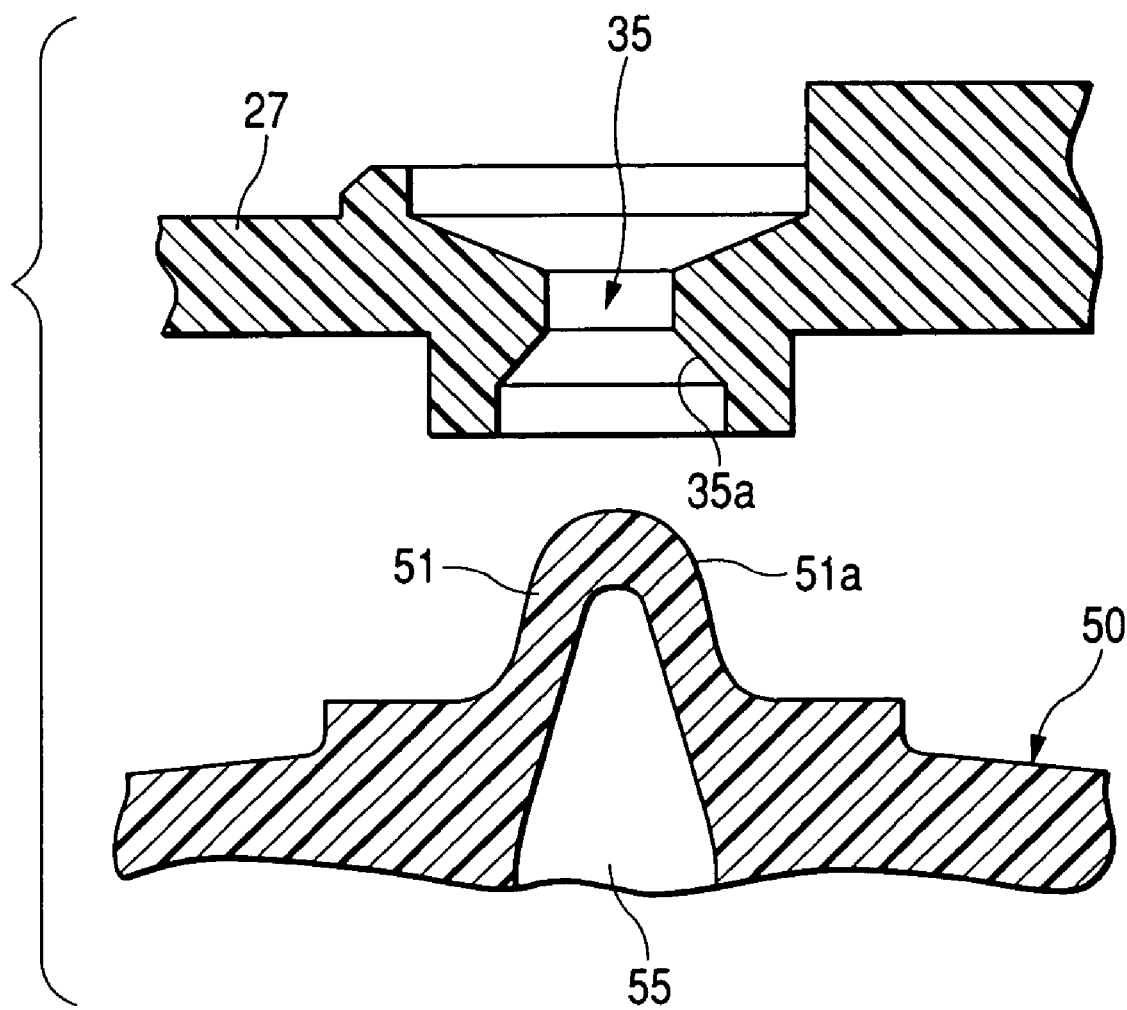
FIG. 8 is a partially enlarged section showing a crest portion of the float valve member and a communication hole of the valve case.
Figure 9A:
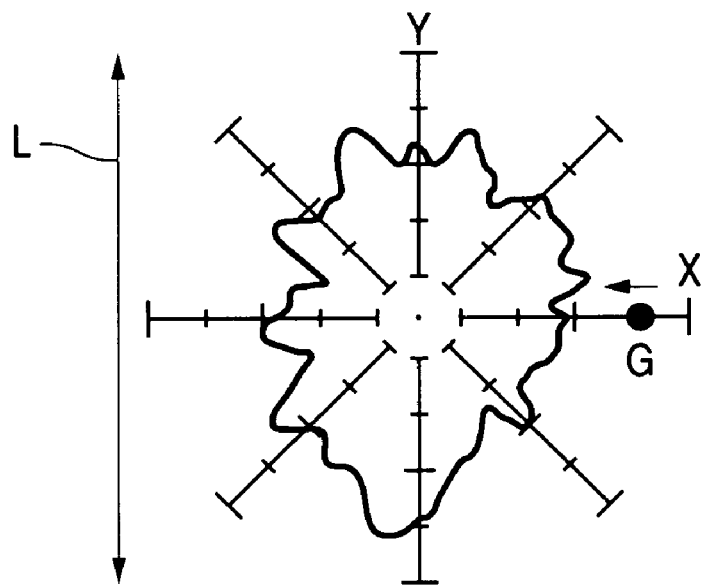
FIG. 9A is an explanatory view showing a relation between the roundness of the crest portion of the float valve member and a gate position.
Figure 9B:
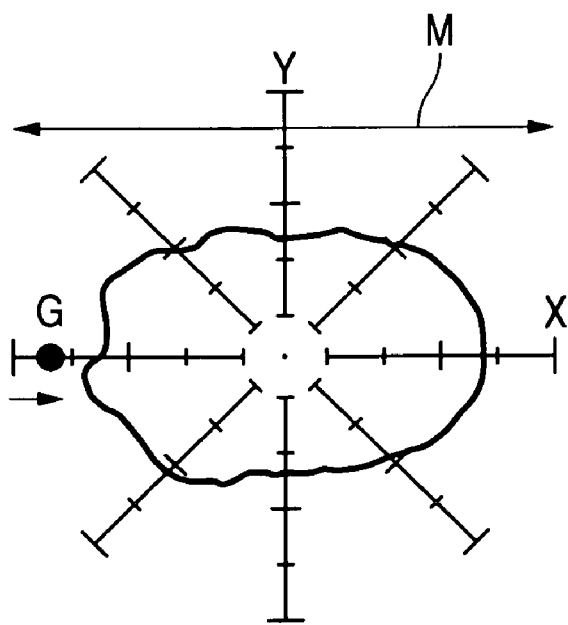
FIG. 9B is an explanatory view showing a relation between the roundness of the communication hole of the valve case and the gate position.

FIG. 1 to FIG. 9B show one embodiment of the float valve device according to the invention. FIG. 1 is an exploded perspective view of a float valve device according to one embodiment of the invention; FIG. 2 is a perspective view showing the state of the float valve device, in which a float valve member is to be inserted into a valve case body; FIG. 3A is a longitudinal section showing the state of the float valve device, in which the float valve member is inserted in the valve case body, FIG. 3B is a section taken along line I—I of FIG. 3A; FIG. 4A is a top plan view of the float valve member; FIG. 4B is a section taken along line II—II of FIG. 4A; FIG. 4C is a section taken along line III—III of FIG. 4B; FIG. 5 is a longitudinal section of the float valve device; FIG. 6 is an explanatory view showing the state, in which the valve of the float valve device arranged in a fuel tank is opened; FIG. 7 is an explanatory view showing the state, in which the valve of the float valve device arranged in a fuel tank is closed; FIG. 8 is a partially enlarged section showing a crest portion of the float valve member and a communication hole of the valve case; FIG. 9A is an explanatory view showing a relation between the roundness of the crest portion of the float valve member and a gate position, and FIG. 9B is an explanatory view showing a relation between the roundness of the communication hole of the valve case and the gate position.

As shown in FIG. 1, a float valve device 10 is constructed to include: a valve case 20 having a valve case body 21 and a cover member 22; a float valve member 50 housed in the valve case 20; and a spring 69 for applying an upward biasing force to the float valve member 50.

The valve case body 21 is formed as a whole into a cylindrical shape having a closed upper case and an opened lower face, and its upper wall 27 has a bracket 23 formed to be inserted into a fixing fitting 70 attached to the inner wall of a fuel tank, for example. This bracket 23 is constructed to include: a tongue portion 24 attached in parallel at a predetermined clearance to the upper wall 27 of the valve case body 21; a projecting member 25 projecting from one end of the tongue portion 24; and a pawl portion 26 projecting from the lower face of the distal end portion of the projecting member 25.

On the other hand, the fixing fitting 70 is provided with: two side portions 71 fixed on the inner wall of the fuel tank or the like by welding means; a central portion 72 spaced at a predetermined clearance from the inner wall of the fuel tank; and a notched portion 73 cut in a U-shape from one side of the central portion 72. When the projecting member 25 of the bracket 23 is inserted into the notched portion 72, the tongue portion comes into engagement of the two side edge portions of the notched portion 73, and the pawl portion 26 of the projecting member 25 comes into engagement of a side 74 opposed to the notched portion 73 so that the bracket 23 is prevented from coming out.

The valve case body 21 has a plurality of through holes 29 formed in its circumferential wall 28 so that a liquid such as fuel can flow into and out of a valve chamber 30. At one portion of the circumferential wall 28, moreover, there is integrally formed a lead-out pipe 31 to be connected to a not-shown pipeline. This lead-out pipe 31 communicates on its proximal end side with a cell 32 formed above the upper wall 27. This cell 32 is a space defined by the upper wall 27, a circumferential wall 33 formed in a rib shape over the upper wall 27, and a ceiling wall 34 closing their upper portions.

At the center of the upper wall 27 of the valve case body 21, there is formed a communication hole 35 for providing the communication between the valve chamber 30 and the cell 32. This communication hole 35 has a circular shape, as viewed in the vertical direction. Moreover, this communication hole 35 has a lower end opening so tapered in its inner circumference 35*a* as is radially reduced upward to permit a crest portion 51 of the float valve member 50 to come into close contact therewith.

Here, that portion of the upper wall 27, which is arranged in the cell 32, constructs a partition wall portion in the invention. Depending upon the application, however, the cell 32 is not necessarily essential, but the communication hole may also be exposed to the upper wall 27 of the valve case body 21.

On the inner circumference of the valve case body 21, there are formed ribs 36, which extend in parallel and at a predetermined circumferential interval. These ribs 36 make sliding contacts at their ridge portions with the outer circumference of the later-described float valve member 50 thereby to guide the upward and downward actions of the float valve member 50. These ribs 36 are basically spaced at the constant interval. However, a pair of diametrically opposed ribs 36*a* are shortened at their lower ends. As a result, the spacing 37 of the ribs 36 located at the portions where the ribs 36*a* are cut midway is about two times as long as the spacing between the ribs 36 at the remaining portions. The ribs 36*a* are made as long as possible at their lower end positions within such a range as not to obstruct the upward and downward actions of the later-described float valve member 50.

Figure 3A:
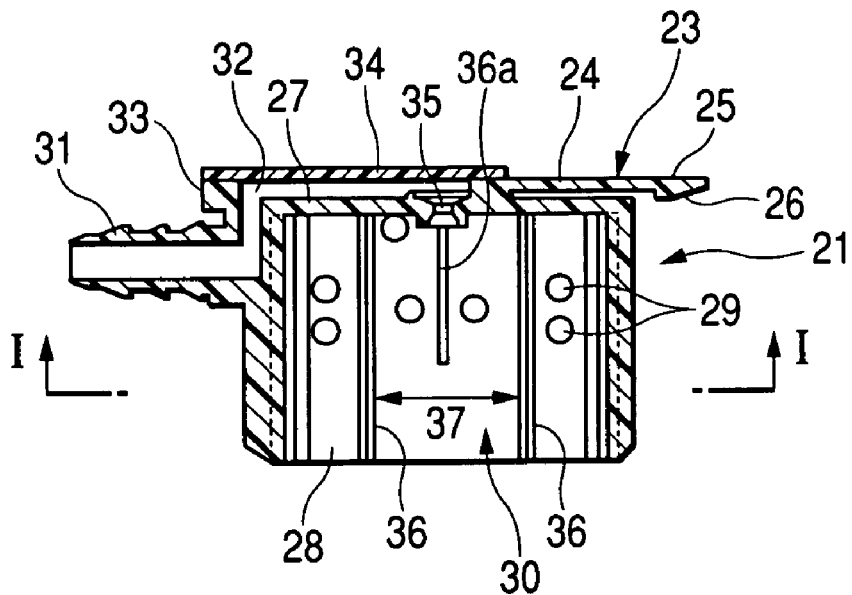
FIG. 3A is a longitudinal section showing the state of the float valve device, in which the float valve member is inserted in the valve case body.
Figure 3B:
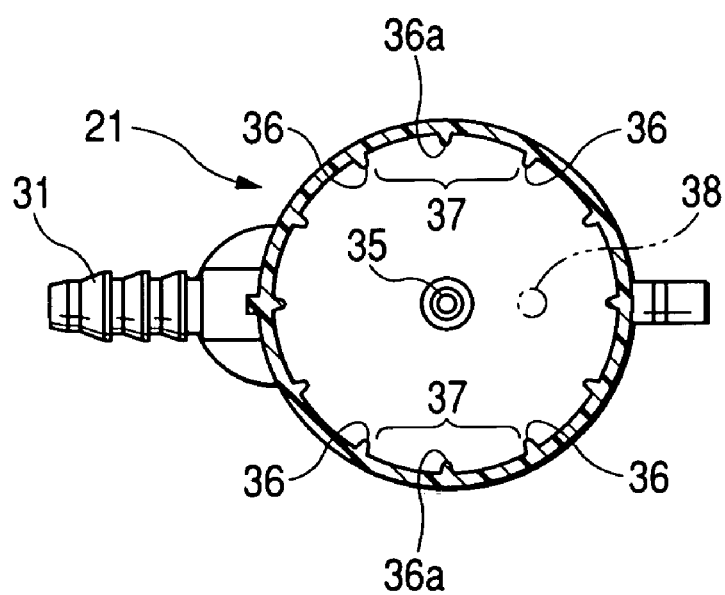
FIG. 3B is a section taken along line I—I of FIG. 3A.
Figure 4A:
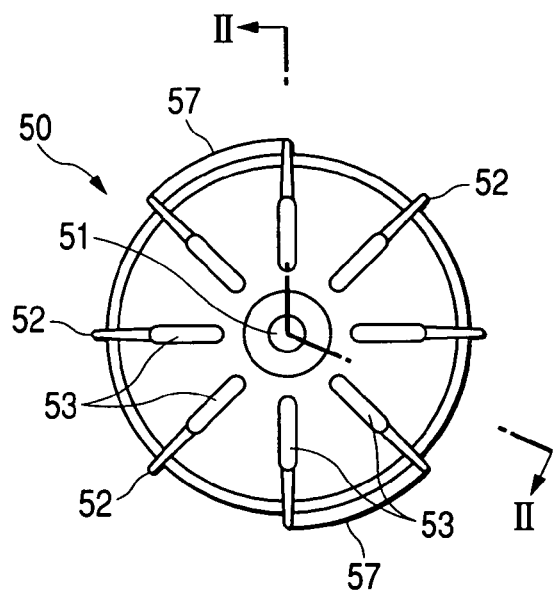
FIG. 4A is a top plan view of the float valve member.
Figure 4B:
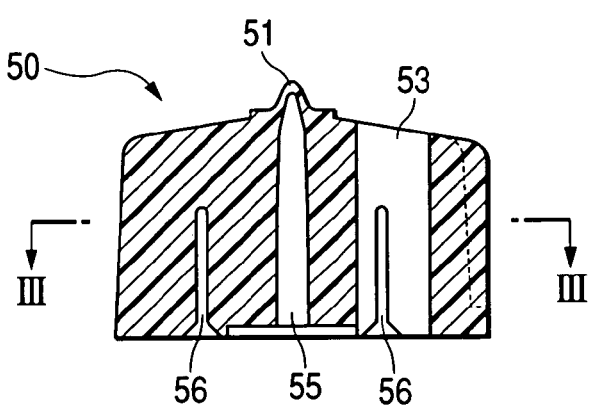
FIG. 4B is a section taken along line II—II of FIG. 4A.
Figure 4C:
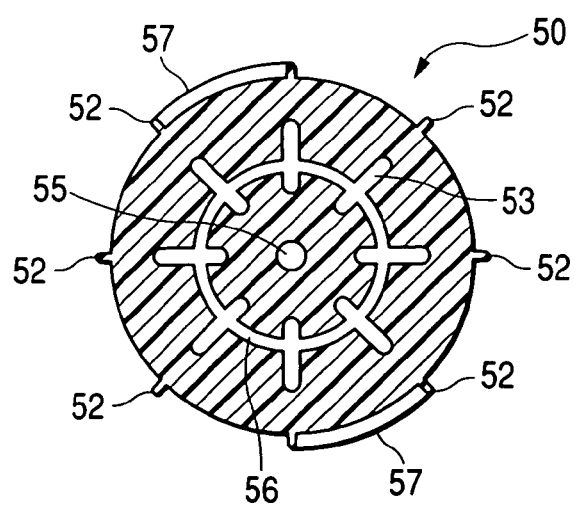
FIG. 4C is a section taken along line III—III of FIG. 4B.

Here, reference numeral 38 in FIG. 3B designates the position of a gate at the injection molding time. Moreover, the outer circumference of the lower edge portion of the valve case body 21 has a plurality of pawls 39 formed at a spacing of a predetermined angle for engaging with the cover member 22.

On the other hand, the cover member 22 is provided with a circular bottom wall 40 and a circumferential wall 41 to be covered with the outer circumference of the lower edge portion of the valve case body 21. The bottom wall 40 has a plurality of through holes 42 formed for permitting the liquid such as the fuel to freely come in. Further formed are positioning ribs 44 for supporting the lower face of the spring 69 stably. Moreover, the circumferential wall 41 has engaging holes 45 formed to fit therein the pawls 39 when the cover member 22 is fitted on the outer circumference of the lower edge portion of the valve case body 21.

Next, the float valve member 50 is formed as a whole into a generally cylindrical shape and has vertically extending ribs 52 formed on its outer circumference in parallel and at a predetermined circumferential interval. In other words, the ribs 52 are formed to extend vertically and to project radially from the outer circumference of the float valve member 50. The crests of the ribs 52 make sliding contacts with the inner circumference of the valve case body 21 thereby to guide the upward and downward actions of the float valve member 50.

The ribs 52 have upper ends 52*a* projected so slightly upward that they come into abutment against the upper wall 27 of the valve case body 21 to correct the inclination of the float valve member 50 thereby to guide the crest portion 51 vertically into the communication hole 35. When the upper ends 52*a* of the ribs 42 come into abutment against the upper wall 27, moreover, a clearance is retained between the float valve member 50 and the upper wall 27. When the valve is opened, therefore, the crest portion 51 of the float valve member 50 can easily leave the communication hole 35.

In the inner sides of those ribs 52, there are formed slits 53, which vertically extend through the float valve member 50. These slits 53 permit the liquid such as the fuel in the vertical space of the float valve member 50 to freely flow back and forth thereby to smoothen the actions of the float valve member 50 between the float valve member 50 and the valve case body 21.

At the center of the bottom wall 54 of the float valve member 50, on the other hand, there is formed a hole 55, which extends so long as the vicinity of the crest portion 51. This hole gives the crest portion 51 a constant wall thickness so that the formation of sink marks at the injection molding time is suppressed to enhance the molding precision of the crest portion 51. Further formed is an annular recess 56, which extends from the bottom wall 54 to the midway of the height of the float valve member 50. The spring 69 is fitted in the annular recess 56 so that it is stably retained.

Here in case the float valve member 50 is not dipped up to a predetermined height in the liquid such as the fuel, the spring 69 is held in the state where it is compressed by the mass of the float valve member 50, that is, where the float valve member 50 abuts against the bottom wall 40 of the cover member 22. When the float valve member 50 is dipped up to the predetermined height in the liquid such as the fuel, the spring is so adjusted in its biasing force that it can push up the float valve member 50 with the aide of the floating force.

At the two diametrically opposed portions between the ribs 52 of the float valve member 50, moreover, there are formed brims 57, which project from the outer circumference of the bottom wall 54 to connect the two adjoining ribs 52. As shown in FIG. 2, those brims 57 are fitted in the spacings 37 of the ribs 36, at which the ribs 36a of the valve case body 21 are cut midway. Moreover, the brims 57 cannot be fitted in the spacings of the remaining ribs 36 so that they prevent the errors in the assembly angle at the assembling time and regulate the angle, at which the float valve member 50 is inserted into the valve case body 21, to a predetermined value. Still moreover, the brims 57 are regulated in turning motions by abutting against the adjoining ribs 36 in those spacings 37 thereby to regulate the turning motions of the float valve member 50 acting upward and downward.

Here in FIG. 1, reference numeral 58 at the upper face of the float valve member 50 designates a gate position at the time when the float valve member 50 is injection-molded.

The invention is characterized in that the angle of the float valve member 50 with the valve case body 21, i.e., the angle determined by the brims 57 fitted in the spacings 37 is so set that the deformed direction of the roundness of the communication hole 35, as based on the gate position 38 of the valve case body 21 and the gate position 58 of the float valve member 50, may be substantially the same as the deformed direction of the roundness of the crest portion 51. Here, the roundness is measured by the radial method using a roundness meter.

FIGS. 9A and 9B plot the results of measurements, which were obtained by using the roundness meter (known under the trade name of "Round Test" and manufactured by Mitsutoyo), of the roundnesses of the crest portion 51 of the injection-molded float valve member 50 and the communication hole 35 of the valve case body 21. FIG. 9A is a diagram illustrating the roundness of the crest portion 51 of the float valve member 50, and FIG. 9B is a diagram illustrating the roundness of the communication hole 35 of the valve case body 21. Letter G in FIGS. 9A and 9B designate the individual gate positions.

Here, the direction of deformation from the roundness in the invention means the direction, in which the roundness most changes, e.g., the most projecting direction with respect to the roundness, and is indicated by arrow L in the case of the float valve member of FIG. 9A and by arrow M in the case of the valve case body of FIG. 9B. In the invention, moreover, the angle of the float valve member 50 with the valve case body 21 is so set that the angle made between the direction of arrow L and the direction of arrow M maybe within 20 degrees, preferably within 10 degrees, more preferably within 5 degrees.

Here, the deformations of roundness are caused due to the gate positions so that the individual parts molded from the common mold exhibit similar tendencies.

FIGS. 6 and 7 show an example, in which the float valve device 10 is applied to the fuel cutoff valve in the fuel tank of an automobile. In FIGS. 6 and 7, numeral 80 designates the upper wall of the fuel tank, and letter F designates the fuel. The fixing fitting 70 is welded in advance to the fuel tank upper wall 80, and the float valve device 10 is mounted in the aforementioned mode through that fixing fitting 70 on the inner face of the fuel tank upper wall 80. To the lead-out pipe 31 of the float valve device 10, there is connected a pipeline 81, which is led to the outside of the fuel tank so that it is connected to the not-shown canister or the like.

In the state where the float valve device 10 is not dipped under the liquid level of the fuel F or where the float valve device 10 does not exceed, although dipped, a predetermined level with respect to the float valve member 50, as shown in FIG. 6, the spring 69 is compressed by the mass of the float valve member 50 so that the float valve member 50 leaves the upper wall 27 of the valve case body 21 thereby to open the communication hole 35. As a result, the fuel vapor occupying the fuel tank flows from the communication hole 35 to the not-shown canister or the like through the cell 32 and the pipeline 81.

As shown in FIG. 7, the liquid level of the fuel F rises either as the fuel F is supplied or as the fuel F is rocked or inclined by the run of the automobile. When the float valve member 50 is dipped in the fuel F to a predetermined level or higher, a buoyancy acts on the float valve member 50. By this buoyancy and the biasing force of the spring 69, therefore, the float valve member 50 is floated to abut against the upper wall 27 of the valve case body 21. As a result, the crest portion 51 of the float valve member 50 closes the communication hole 35 so that it blocks the flow of the fuel F into the cell 32 thereby to prevent the fuel from flowing into the pipeline 81.

In the invention, the brims 57 of the float valve member 50 are fitted in the wider spacings 37 between the ribs 36 of the valve case body 21 thereby to regulate the angle of the float valve member 50 relative to the valve case body 21. This angle is so set that the deformed direction of the roundness of the communication hole 35 and the deformed direction of the roundness of the crest portion 51 may be substantially aligned within a predetermined angular range. Therefore, the sealing properties between the outer circumference of the crest portion 51 and the inner circumference of the communication hole 35 can be improved to prevent the leakage of the fuel F more reliably.

This embodiment is provided with the wider spacings 37 and the brims 57 of the float valve member 50 individually by two in number, but those portions 37 and 57 may be individually at least one in number. Alternatively, the ribs may be formed on either the inner circumference of the valve case body or the outer circumference of the float valve member, and the brims may be formed on the other circumference.

The float valve device, as shown in FIG. 1 to FIG. 9B, was manufactured, and the roundness of the crest portion 51 of the float valve member 50 and the roundness of the communication hole 35 of the valve case body 21 were measured by the aforementioned method using the roundness meter (known under the trade name of "Round Test" and manufactured by Mitsutoyo). Tests were made on the static sealing properties for the cases, in which their deformed directions were accurately aligned with each other and intersecting at 90 degrees.

Figure 10:
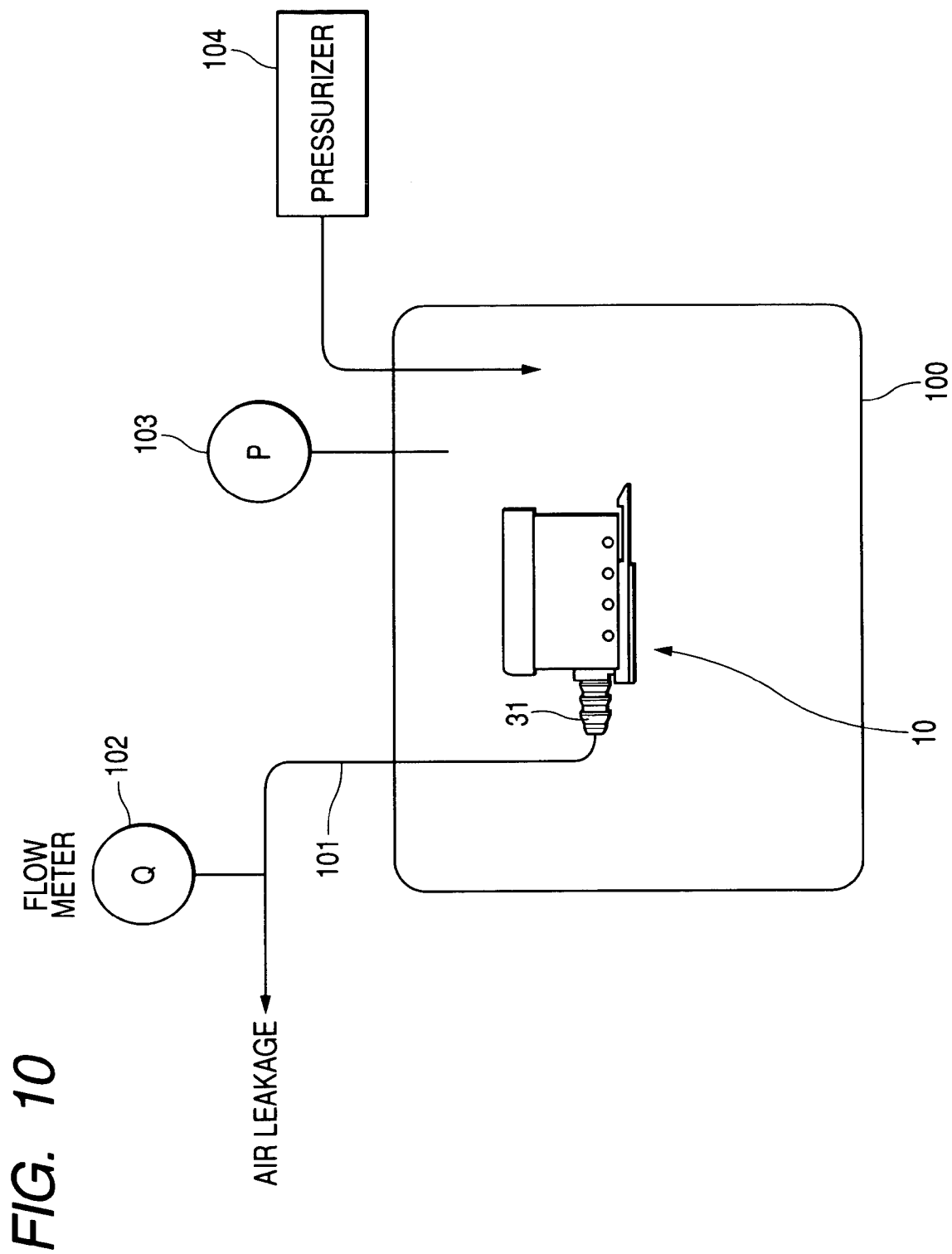
FIG. 10 is an explanatory view showing a method for measuring the static sealing properties of the float valve device.

The static sealing properties were measured by the method of FIG. 10 using a flow meter (or a flow tester). Specifically, the float valve device 10 was reversed and arranged in a pressure tank 100. A pipeline 101 connected to the lead-out pipe 31 was extracted in a hermetically sealed state from the inside of the pressure tank 100, and a flow meter 102 was connected to that pipeline 101. A pressure gauge 103 and a pressurizer 104 were connected to the pressure tank 100. In this state, the tests were made by introducing air from the pressurizer 104 to raise the pressure in the pressure tank 100 and by measuring the air leakage from the float valve device 10 with the flow meter 102. These measurement tests were made on five samples to determine their average, maximum and minimum values. The results are tabulated in Table 1.

TABLE 1

| Sample Nos. | Flow Rates (cc/min.) of Case (1) | Flow Rates (cc/min.) of Case (2) |
| --- | --- | --- |
| 1 | 10.5 | 3.9 |
| 2 | 8.0 | 2.7 |
| 3 | 8.1 | 4.1 |
| 4 | 11.6 | 3.5 |
| 5 | 13.9 | 4.0 |
| Average | 10.4 | 3.6 |
| Maximum | 13.9 | 4.1 |
| Minimum | 8.0 | 2.7 |

In Table 1:
Case (1) had the deformed directions intersecting at 90 degrees; and
Case (2) had the deformed directions aligned with each other.

It is found from the results of Table 1 that the case, in which the deformed directions of the roundness of the crest portion 51 of the float valve member 50 and the roundness of the communication hole 35 of the valve case body 21 were aligned, had remarkably lower flow rates than those of the case, in which those deformed directions intersecting at 90 degrees, and accordingly had remarkably improved sealing properties.

according to the invention, as has been described hereinbefore, the allowable angle of the float valve member with respect to the valve case is so set that the deformed direction, as caused by the gate position at the injection molding time, of the inner circumference of the communication hole of the valve case with respect to the roundness and the deformed direction, as caused by the gate position at the injection molding time, of the outer circumference of the crest portion of the float valve member with respect to the roundness may be substantially aligned, and there is provided a angle regulating unit interposed between the valve case and the float valve member for preventing the angle of the float valve member with respect to the valve case from varying over the allowable angle when the float valve member acts upward and downward. Therefore, the crest portion of the float valve member abuts at such an angle against the inner circumference of the communication hole of the valve case that the changing directions with respect to the individual roundnesses may be aligned with each other. Thus, it is possible to improve the contacts between the sealing faces at the closing time thereby to prevent the leakage of the liquid more reliably.

What is claimed is:

1. A float valve device comprising:
  a valve case; and
  a float valve member arranged to acts upward and downward in the valve case; and
  a angle regulating unit wherein:
  the valve case and the float valve member are injection-molded of a resin;
  the valve case includes a valve chamber, in which the float valve member is arranged, a partition wall portion formed in the upper portion of the valve chamber, and a communication hole formed in the partition wall portion;
  the float valve member acts upward and downward according to the level of a liquid to flow into the valve chamber and includes a crest portion for closing the communication hole when it abuts against the partition wall portion;
  the inner circumference of the communication hole of the valve case is deformed to a first direction with respect to the roundness, as caused by the gate position at the injection molding time;
  the outer circumference of the crest portion of the float valve member is deformed to a second direction with respect to the roundness, as caused by the gate position at the injection molding time;
  an allowable angle of the float valve member related to the valve case is so set that the first direction and the second direction is substantially aligned; and
  the angle regulating unit interposed between the valve case and the float valve member for preventing the angle of the float valve member with respect to the valve case from varying over the allowable angle when the float valve member acts upward and downward.

2. A float valve device according to claim 1, wherein:
  the angle regulating unit includes:
    a plurality of vertically extending parallel ribs formed on one of the inner circumference of the valve case and the outer circumference of the float valve member; and
    a brim formed on the other of the inner circumference of the valve case and the outer circumference of the float valve member and adapted to be fitted in the spacing of the ribs; and
  the spacing between the ribs to fit the brim therein is made wider than the spacings between the remaining ribs so that the brim may be unable to be fitted in the spacings between the remaining ribs.

3. A float valve device according to claim 2, wherein:
  the ribs are formed on the inner circumference of the valve case;
  the brim is formed on the outer circumference of the float valve member; and
  the ribs, which are located between the ribs on the inner circumference of the valve case for fitting the brim therein, are formed within such a partial range only on the upper side as not to obstruct the upward and downward actions of the float valve member.

* * * * *